United States Patent
Humblet

(10) Patent No.: US 8,942,136 B2
(45) Date of Patent: Jan. 27, 2015

(54) ALLOCATING COMMUNICATION FREQUENCIES TO CLUSTERS OF ACCESS POINTS

(75) Inventor: Pierre A. Humblet, Cambridge, MA (US)

(73) Assignee: Airvana LP, Chelmsford, MA (US)

( * ) Notice: Subject to any disclaimer, the term of this patent is extended or adjusted under 35 U.S.C. 154(b) by 1608 days.

(21) Appl. No.: 12/246,861

(22) Filed: Oct. 7, 2008

(65) Prior Publication Data
US 2010/0085910 A1 Apr. 8, 2010

(51) Int. Cl.
H04W 48/02 (2009.01)
H04W 16/02 (2009.01)
H04W 84/04 (2009.01)
H04W 16/32 (2009.01)

(52) U.S. Cl.
CPC ............ *H04W 16/02* (2013.01); *H04W 84/045* (2013.01); *H04W 16/32* (2013.01)
USPC ............................. 370/254; 370/328; 370/351

(58) Field of Classification Search
USPC .......... 370/326, 329, 331, 332, 322; 455/444, 455/443, 446, 447, 440, 452.1
See application file for complete search history.

(56) References Cited

U.S. PATENT DOCUMENTS

| | | | |
|---|---|---|---|
| 5,799,154 A * | 8/1998 | Kuriyan ........................ 709/223 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,961,323 B1 * | 11/2005 | Xu et al. ........................ 370/329 |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,835,698 B2 | 11/2010 | Eyuboglu et al. | |
| 7,933,619 B2 | 4/2011 | Kim | |
| 7,983,672 B2 | 7/2011 | Humblet et al. | |
| 8,060,058 B2 | 11/2011 | Ch'ng et al. | |
| 8,165,528 B2 | 4/2012 | Raghothaman et al. | |
| 8,229,397 B2 | 7/2012 | Hou et al. | |
| 8,259,671 B2 | 9/2012 | Raghothaman et al. | |
| 8,295,256 B2 | 10/2012 | Humblet et al. | |

(Continued)

FOREIGN PATENT DOCUMENTS

WO  WO2010/011084  1/2010

OTHER PUBLICATIONS

3rd Generation Partnership Project "3GPP2", "cdma2000 High Rate Packet Data Air Interface Specification", TIA/EIA/IS-856, C.S0024, version 4.0, Oct. 25, 2002 (548 pages).

(Continued)

*Primary Examiner* — Donald Mills
*Assistant Examiner* — Henry Baron
(74) *Attorney, Agent, or Firm* — Fish & Richardson P.C.

(57) ABSTRACT

A system is used in a wireless communication system made up of cells, at least one of which includes at least one sector. The system includes first access points in a first area of a sector of a cell. The first access points are prohibited from communicating over a first frequency. The system also includes second access points in a second area of the sector of the cell. The second access points are prohibited from communicating over a second frequency that is different from the first frequency.

22 Claims, 4 Drawing Sheets

(56) References Cited

U.S. PATENT DOCUMENTS

| | | |
|---|---|---|
| 8,345,694 B2 | 1/2013 | Den et al. |
| 8,355,727 B2 | 1/2013 | Hoang et al. |
| 8,358,623 B2 | 1/2013 | Samar et al. |
| 8,400,989 B2 | 3/2013 | Ch'ng et al. |
| 8,402,143 B2 | 3/2013 | Ramaswamy et al. |
| 8,452,299 B2 | 5/2013 | Raghothaman et al. |
| 8,520,659 B2 | 8/2013 | Humblet |
| 8,543,139 B2 | 9/2013 | Samar et al. |
| 8,554,231 B2 | 10/2013 | Jones |
| 8,594,663 B2 | 11/2013 | Ch'ng et al. |
| 8,615,593 B2 | 12/2013 | Ch'ng et al. |
| 8,750,271 B2 | 6/2014 | Jones |
| 8,781,483 B2 | 7/2014 | Ch'ng |
| 2002/0196749 A1 | 12/2002 | Eyuboglu et al. |
| 2003/0100311 A1 | 5/2003 | Chung et al. |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2006/0067422 A1 | 3/2006 | Chung |
| 2006/0067451 A1 | 3/2006 | Pollman et al. |
| 2006/0126509 A1 | 6/2006 | Abi-Nassif et al. |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0070510 A1* | 3/2008 | Doppler et al. ............... 455/69 |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2009/0156218 A1 | 6/2009 | Garg et al. |
| 2009/0163238 A1 | 6/2009 | Rao et al. |
| 2009/0168766 A1 | 7/2009 | Eyuboglu et al. |
| 2009/0172397 A1 | 7/2009 | Kim |
| 2010/0085910 A1 | 4/2010 | Humblet |
| 2010/0118801 A1* | 5/2010 | Yavuz et al. ............... 370/329 |
| 2011/0026441 A1* | 2/2011 | Diener et al. ............... 370/260 |
| 2011/0128916 A1* | 6/2011 | Kwon et al. ............... 370/328 |
| 2012/0178415 A1 | 7/2012 | Ch'ng et al. |
| 2013/0136104 A1 | 5/2013 | Samar et al. |

OTHER PUBLICATIONS

3rd Generation Partnership Project "3GPP2", "cdma2000 High Rate Data Air Interface Specification", TIA/EIA/IS-856, C.S0024-A, version 2.0, Jul. 2005 (1227 pages).

3rd Generation Partnership Project "3GPP2", "cdma2000 High Rate Data Air Interface Specification", TIA/EIA/IS-856, C.S0024-B, version 1.0, Apr. 2006 (1623 pages).

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "Introduction to cdma2000 Standards for Spread Spectrum Systems", 3Gpp2 C.S0001-D, Version 2.0, Sep. 6, 2005, Release D (16 pages).

3rd Generation Partnership Project 2 "3GPP2", "Physical Layer Standard for cdma2000 Spread Spectrum Systems", 3GPP2 C.S0002-D, Version 2.0, Sep. 6, 2005, Revision D (538 pages).

3rd Generation Partnership Project 2 "3GPP2", "Medium Access Control (MAC) Standard for cdma2000 Spread Spectrum Systems", 3GPP2 C.S0003-D, Version 2.0, Sep. 6, 2005, Release D (255 pages).

3rd Generation Partnership Project 2 "3GPP2", "Signaling Link Access Control (LAC) Standard for cdma2000 Spread Spectrum Systems", Release D, 3GPP2 C.S0004-D, Version 2.0, Sep. 2005, Revision D. v2.0, (264 pages).

3rd Generation Partnership Project 2 "3GPP2", "Upper Layer (Layer 3) Signaling Standard for cdma2000 Spread Spectrum Systems", Release D, 3GPP2 C.S0005-D, Version 2.0, Sep. 2005, Release D (2367 pages).

3rd Generation Partnership Project 2 "3GPP2", "Analog Signaling Standard for cdma2000 Spread Spectrum Systems", 3GPP2 C.S0006-D, Version 2.0, Sep. 2005, Release D (95 pages).

* cited by examiner

ALLOCATING COMMUNICATION FREQUENCIES TO CLUSTERS OF ACCESS POINTS

TECHNICAL FIELD

This patent application describes a system for use in a wireless communication, which clusters access points and allocates communication frequencies to the clusters.

BACKGROUND

When connecting to a radio network, an access terminal selects an access point from available radio network access points that are within communication range. Network protocols are used in communicating between an access point and the access terminal.

The 1xRTT protocol has been standardized by the Telecommunication Industry Association (TIA) in the TIA-2000.1 through TIA-2000.6 series of specifications, which are incorporated herein by reference.

The 1xEV-DO protocol has been standardized by the TIA as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-8560B, 3GPP2 C.S0024-B, version 1.0, May 2006, and is also incorporated herein by reference. Other wireless communication protocols, such as UMTS (Universal Mobile Telecommunications Service), may also be used.

SUMMARY

A system is described for use in a wireless communication system comprised of cells, at least one of which comprises at least one sector The system comprises first access points in a first area of a sector of a cell, where the first access points are prohibited from communicating over a first frequency, and second access points in a second area of the sector of the cell, where the second access points are prohibited from communicating over a second frequency that is different from the first frequency. The system may also comprise one or more of the following features, either alone or in combination.

The first access points may be prohibited from communicating over a third frequency that is different from the first frequency and the second frequency. The second access points may be prohibited from communicating over a fourth frequency that is different from the first frequency, the second frequency, and the third frequency.

The system may comprise third access points in a third area of the sector of the cell, where the third access points are prohibited from communicating over a third frequency that is different from the first frequency and different from the second frequency. The system may comprise an $N^{th}$ (N>3) set of access points in an $N^{th}$ area of the sector of the cell, where the $N^{th}$ set of access points are prohibited from communicating over an $N^{th}$ frequency that is different from the first frequency, different from the second frequency, and different from the third frequency.

The system may comprise a mobile station and a controller associated with the sector. The controller may be configured to direct the mobile station, after entering an area of the sector, to communicate over a frequency over which access points in the area are prohibited from communicating. The controller may be configured to identify interference in communications with the mobile station and to thereafter direct the mobile station.

The first area and the second area may be separated by a zone in which communications of the first access points and the second access points do not interfere. The zone may be predefined based on geography of a region encompassing the sector.

Also described herein is a method for use in a wireless communication system comprised of cells, at least one of which comprises at least one sector. The method comprises first access points in a first area of a sector of a cell communicating over one or more frequencies but not over a first frequency, and second access points in a second area of the sector of the cell communicating over one or more frequencies but not over a second frequency that is different from the first frequency. The method may also comprise one or more of the following features, either alone or in combination.

The first access points may be prohibited from communicating over a third frequency that is different from the first frequency and the second frequency. The second access points may be prohibited from communicating over a fourth frequency that is different from the first frequency, the second frequency, and the third frequency.

The method may comprise third access points in a third area of the sector of the cell communicating over one or more frequencies but not over a third frequency that is different from the first frequency and different from the second frequency. The method may comprise an $N^{th}$ (N>3) set of access points in an $N^{th}$ area of the sector of the cell communicating over one or more frequencies but not over an $N^{th}$ frequency that is different from the first frequency, from the second frequency, and from the third frequency.

The method may comprise a mobile station attempting to communicate with a base station associated with the sector, and a controller directing the mobile station, after entering an area of the sector, to communicate over a frequency over which access points in the area are prohibited from communicating. The controller may identify interference in communications with the mobile station and thereafter direct the mobile station.

The first area and the second area may be separated by a zone in which communications of the first access points and the second access points do not interfere. The zone may be predefined based on geography of a region encompassing the sector.

Also described herein is a method that comprises sharing frequencies for communication among access points of a cell sector and, in each predefined area of a sector, reserving at least one frequency for communication by a mobile station, where the at least one frequency is different in each area. Access points in each area of the sector are configured not to communicate over the at least one frequency for each corresponding area. The method may also comprise one or more of the following features, either alone or in combination.

Upon entering an area of the sector, the mobile station may be controlled to communicate over the at least one frequency corresponding to the area entered if interference from an access point is detected. There may be N (N≥2) areas, and there may be a multiple of N frequencies reserved for communication by the mobile station. Predefined areas of the sector may be separated by substantially interference-free zones.

The foregoing methods, or any aspect thereof, may be implemented as a computer program product comprised of instructions that are stored on one or more machine-readable media, and that are executable on one or more processing devices. The foregoing method may be implemented as an apparatus or system that includes one or more processing devices and memory to store executable instructions to implement the method.

The details of one or more examples are set forth in the accompanying drawings and the description below. Further features, aspects, and advantages will become apparent from the description, the drawings, and the claims.

DETAILED DESCRIPTION

Figure 1:
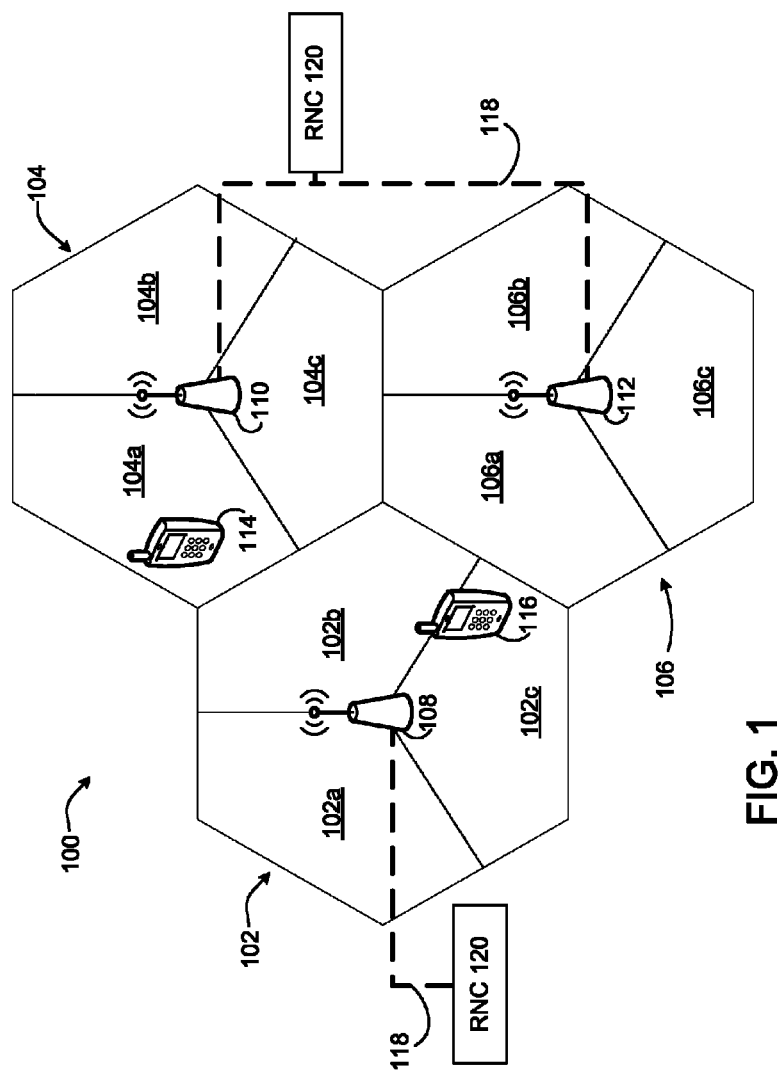
FIG. 1 shows an example of a cellular network.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs, also known as mobile stations) located in the cell. Each cell is often further divided into sectors 102a-c, 104a-c, 106a-c by using multiple sectorized antennas. A cell may use an omnidirectional antenna, in which case the cell has a single sector. In each cell, that cell's radio network access point may serve one or more sectors and may communicate with multiple access terminals in its cell.

The radio access network (RAN) 100 shown in FIG. 1 uses a 1xRTT protocol or an EV-DO protocol to transmit voice and data packets between an access terminal, e.g., access terminals 114, 116, and a radio network access point, e.g., BTSs 108, 110, 112. In the example of FIG. 1, BTSs 108, 110, 112 are connected over backhaul connection(s) 118 to radio network control nodes (RNC) 120, which may be one or more physical devices at different locations. Although this description uses terminology from the 1xRTT ("1x") and EV-DO ("DO") air interface standards in CDMA (Code Division Multiple Access) networks, the same concepts are applicable to other communication methods, including UMTS (Universal Mobile Telecommunications Service), GSM (Global System for Mobile Communications), HSDPA (High Speed Downlink Packet Access), WiMax (Worldwide Interoperability for Microwave Access), WiBro (Wireless Broadband), WiFi, and the like.

For ease of description, communication between wireless network entities, such as between access points and access terminals, is described as occurring at the access point transmission frequency. In general, however, for example, frequency division duplex (FDD) may be used where the transmit frequency of an entity may be associated with, but distinct from, the receive frequency of the entity.

Figure 2:
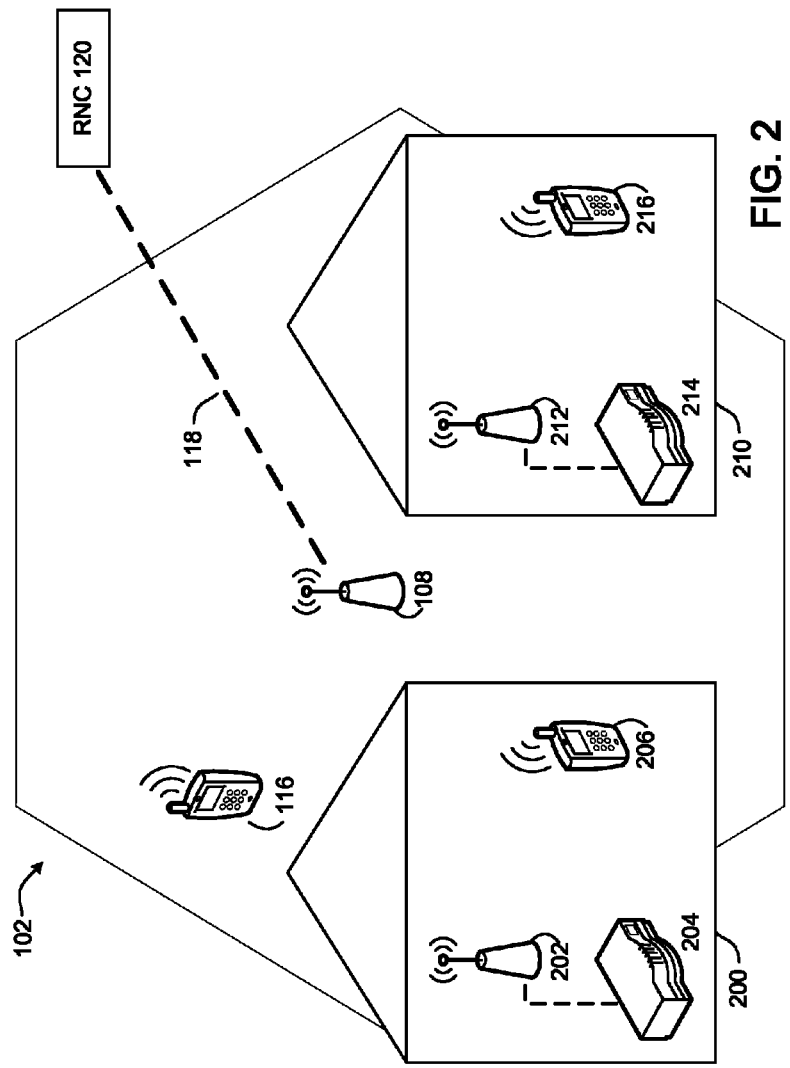
FIG. 2 shows an example of a cell in the cellular network.

As shown in FIG. 2, a radio network access point 202 may be deployed in a user's home 200 in a similar manner as a WiFi® access point. Such a radio network access point is referred to as a private access point. The private access point 202 may use an available high-speed internet connection, such as a DSL or cable modem 204, as the backhaul, with the RNC functionality implemented in the private access point 202. Such a private access point may be installed anywhere, for example, in an office, a public space, or a restaurant. When this description refers to a private access point being in a "home," that encompasses any such location. Private access points may include, for example, femtocells or picocells. In some examples, a private access point may be integrated into a cable modem or other network hardware, such as a router or WiFi access point.

When an authorized access terminal 206 is present inside the home (or anywhere within range of the private access point 202), it may use the private access point 202 rather than a regular cellular radio network access point, such as BTS 108, to place or receive voice calls and data connections, even if the access terminal is otherwise within the cell 102 for that BTS 108. We therefore refer to BTS 108 as a macro BTS to distinguish it from a private access point, as macro BTS 108 provides direct access to the wider RAN. An access terminal or mobile macrocell(s) may send signals to and receive signals from the macro BTS 108.

As in FIG. 1, macro BTS 108 of FIG. 2 is connected over a backhaul connection 118 to the radio network control nodes (RNC) 120, which may be one or more physical devices at different locations. The RNC 120 may be one or more macro controllers, or one or more macro radio network controllers (macro RNC). The macro RNC 120 may include functionality to manage macro access points, such as BTS 108, and facilitate communication between the macro BTS 108 and access terminals, such as the access terminal 206. In general, any function attributed to the RNC 120 may be implemented in the RNC 120, in one or more macro access points such as macro BTS 108, or in any combination thereof. Communications between RNC 120 and access point(s) may be via a macro BTS, direct, or through one or more other intermediary media or devices.

A neighboring home 210 may have its own private access point 212 connected to its cable modem 214 for use by its owner's authorized access terminal 216. Neighboring private access points may operate independently, in part because real-time communication is difficult between neighboring private access points. Private access points may also operate in a licensed spectrum.

The following implementation describes clustering access points and allocating communication frequencies to the clusters. Femtocells and mobile stations are described in the implementation. However, any types of access points may be used.

Figure 3:
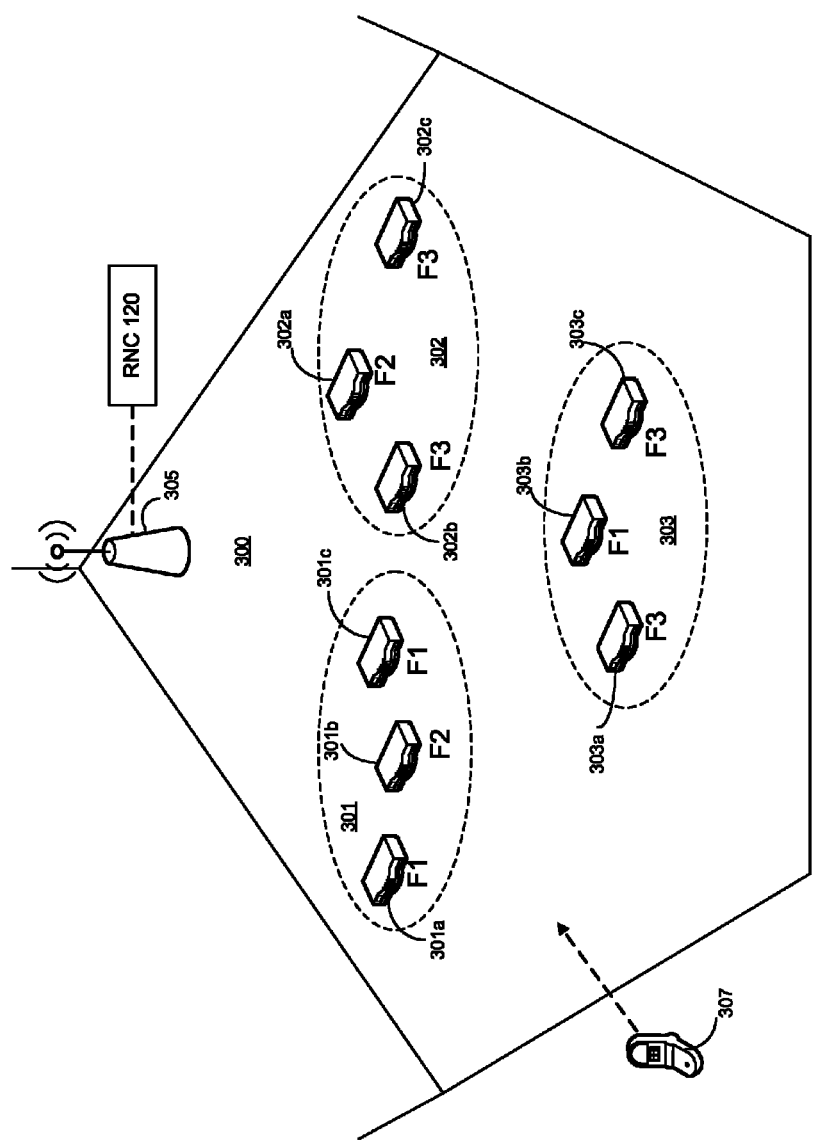
FIG. 3 shows an example of clustering access points in a sector of the cell.

Referring to FIG. 3, each sector of a cell, such as that of FIG. 2, may be partitioned into areas. Three areas are shown in FIG. 3; however, there may be any number of areas per sector. Each area includes a cluster of femtocells. The femtocells in the cluster share one or more frequencies for communication. One or more other frequencies (referred to as "non-femto" frequencies) in that area are reserved for communication between the mobile station and the macro BTS. Femtocells are prohibited from communicating over these non-femto frequency(ies).

In more detail, femtocells of a sector may be configured to communicate over a set of frequencies, which are identified as F1, F2, and F3 in this example. Each area 301, 302, 303 of the sector includes at least one cluster of femtocells. In area 301, femtocells 301a, 301b, 301c are configured to communicate with a mobile station over frequencies F1 and/or F2. A third frequency, here F3, is reserved for communication between a mobile station and macro BTS 305. Femtocells 301a, 301b, 301c are prohibited from communicating over this third frequency and are configured accordingly. In area 302, femtocells 302*a*, 302*b*, 302*c* are configured to communicate with a mobile station over frequencies F2 and/or F3. A third frequency, here F1, is reserved for communication between the mobile station and the macro BTS. Femtocells 302*a*, 302*b*, 302*c* are prohibited from communicating over this third frequency and are configured accordingly. In area 303, femtocells 303*a*, 303*b*, 303*c* are configured to communicate with a mobile station over frequencies F1 and/or F3. A third frequency, here F2, is reserved for communication between the mobile station and the macro BTS. Femtocells 303*a*, 303*b*, 303*c* are prohibited from communicating over this third frequency and are configured accordingly.

The foregoing configuration promotes frequency balancing among the femtocells and the mobile station. That is, the mobile station tends to use a different frequency in each area for communication with the macro BTS in order to avoid interference from nearby femtocells. The remaining frequencies are distributed (e.g., split evenly or as evenly as possible) among the areas for femtocell communication. This results in more equal utilization of frequencies in the sector than if the same frequency were dedicated to the mobile station in each area. It is noted that a mobile station may not be prohibited from using any particular frequencies for communication in a sector if there is no interfering femtocell within communication range.

Furthermore, allocating more than one frequency for femtocell communication is advantageous because it improves communication quality. That is, since there are multiple frequencies to choose from for communication, a femtocell can choose, or be allocated, a frequency in a way that reduces (e.g., minimizes) interference between nearby femtocells.

Areas in a sector are separated by zones in which femtocell density is low. These zones are referred to as "low-interference" zones. In this regard, femtocells and other types of access points operate at relatively low power and, thus, have limited range. It is therefore possible to arrange clusters of femtocells at sufficient distances from each another to substantially prevent cluster-to-cluster interference at a reserved frequency. For example, femtocells using frequency F1 in cluster 301 should not interfere with reserved frequency F1 in cluster 302 or at least the interference should be below some predefined level.

Regions in which the clusters are contained, and in which femtocell communication is permissible, include areas 301, 302, 303 of FIG. 3. Regions in which interference among the clusters is limited are the low-interference zones. These zones are typically predefined, meaning that the femtocells are physically arranged in clusters in the areas so that the zones are formed between the areas. The sizes and shapes of the zones may vary depending, among other things, upon the communication strength of the femtocells.

Physical barriers may be used to separate the areas and thereby define the low-interference zones. For example, parks, highways, waterways, commercial zones, buildings, or the like may be used for separation. The size, shape and construction of the zones may be defined when the sector is configured. Additional clusters of femtocells, which define new areas, may be defined in a sector.

Figure 4:
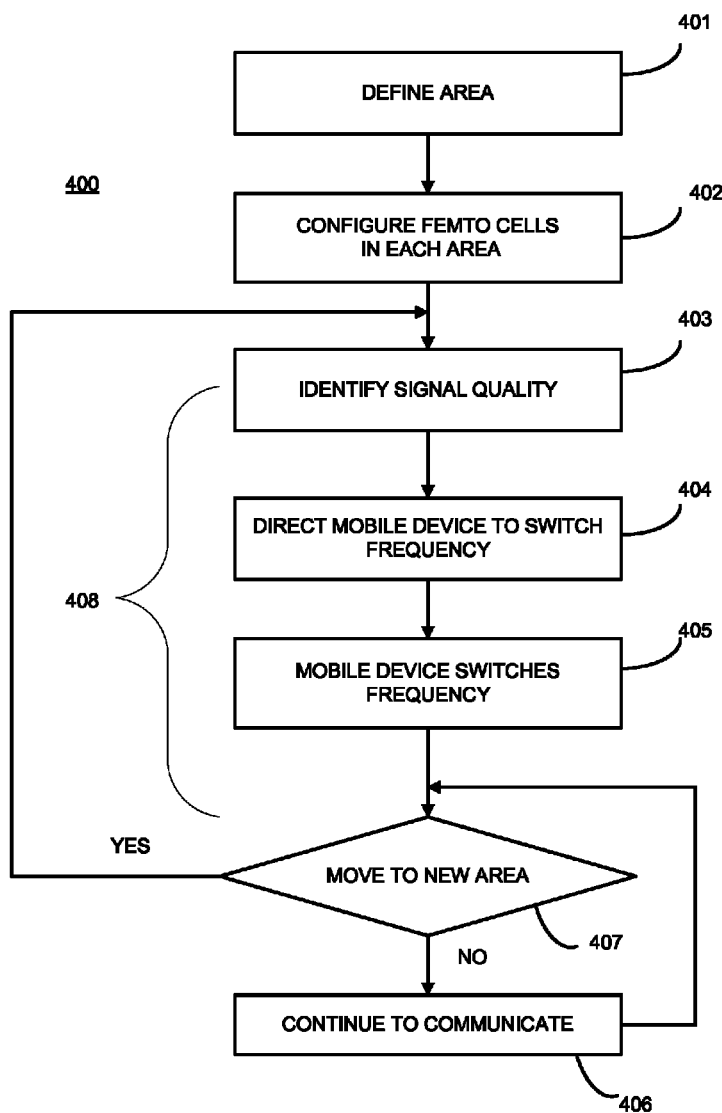
FIG. 4 is a flowchart showing a process that clusters access points in the sector and that allocates communication frequencies to the clusters, while reserving at least one communication frequency for mobile station/base station communication.

FIG. 4 shows a process 400 for use with a system, such as that of FIG. 3. As shown in FIG. 4, process 400 begins by defining (401) the areas within the sector. As explained, areas within a sector are obtained by defining clusters of femtocells that are substantially isolated from one another. This means that femtocells in a cluster are within interference range of each other, but that clusters are not within interference range of each other at a reserved frequency. Such areas may be defined when defining the sector. It is noted that areas may overlap, at least with respect to femtocells that are not reserved for macro BTS/femtocell communication. For example, it is possible to include the same femtocells that communicate over frequency F2 in both areas 301 and 302, since F2 is not reserved for macro BTS/femtocell communication in either of areas 301 and 302.

Femtocells in each cluster are configured (402). The femtocells may be configured manually, e.g., before or after placement in the clusters. Alternatively, the femtocells may be configured automatically using a network provisioning software tool. Femtocells in a cluster may be configured to communicate over a single frequency within an area of the sector. Alternatively, femtocells in a cluster may be configured to share communication frequencies within an area of the sector. In this case, femtocells in a cluster are configured so that each femtocell is capable of communicating over multiple frequencies within the sector. For example, a femtocell may be configured to switch between frequencies F1 and F2 for communication based, e.g., on the communication traffic over those frequencies. In any case, the femtocells are prohibited from communicating over at least one frequency within the sector, and sometimes more than one frequency. For example, as described above with respect to FIG. 3, sector 300 is partitioned into three areas. In area 301, femtocells 301*a*, 301*b*, 301*c* are configured to communicate over frequencies F1 and/or F2, but not over frequency F3; in area 302, femtocells 302*a*, 302*b*, 302*c* are configured to communicate over frequencies F2 and/or F3, but not over frequency F1; and in area 303, femtocells 303*a*, 303*b*, 303*c* are configured to communicate over frequencies F1 and/or F3, but not over frequency F2. The frequencies over which the femtocells are prohibited from communicating are reserved for mobile station/macro BTS communication.

During process 400, a mobile station 307 enters sector 300. While in an area 301, mobile station 307 sends a communication to a macro BTS, which is base station 305 in this example, over frequency F1 (the communication could also be over frequency F2). Because femtocells 301*a*, 301*b*, 301*c* communicate over frequency F1 in area 301, communication to/from the mobile station over frequency F1 has low signal quality. For example, there may be interference resulting from femtocell(s) communicating over the same frequency. RNC 120 identifies (403) a relatively low signal quality, and directs (404) the mobile station to communicate over a different frequency. In this case, RNC 120 directs (404) mobile station 307 to communicate over the frequency that femtocells in the area are prohibited from using. In area 301, that frequency is F3. RNC 120 may be pre-programmed with data identifying, for each area of a sector, which communication frequencies are dedicated to femtocell communication, and which communication frequencies are available for other, non-femtocell communication, including for mobile station/macro BTS communication. Alternatively, RNC 320 can request mobile station 307 to measure and report signal quality at available frequencies which, in this case, include frequencies F2 and F3. RNC 320 can then direct mobile station 307 to use the frequency that has the higher signal quality.

RNC 120 may detect low signal quality using any type of mechanism or algorithm. For example, RNC 120 may compare a signal from the mobile station, or attributes thereof, to predefined signals and/or values. If the comparison is unfavorable, e.g., if the signal from the mobile station does not meet one or more predefined threshold(s), RNC 120 identifies low signal quality. RNC 120 may direct the mobile station to switch communication frequencies by, e.g., sending the mobile station one or more signals over a predefined control channel. In response, the mobile station switches (405) communication frequencies as directed by the base station—here to F3.

While in area 301, mobile station 307 continues (406) to communicate over frequency F3. As noted, femtocells in area 301 are prohibited from communicating over frequency F3. As a result, communications between the mobile station and the macro BTS experience less signal degradation. This is advantageous compared to systems where no frequency is reserved for communication with base station 305, and where frequent frequency switching may thus be required.

Mobile station 307 may move (407) within sector 300 to a new area, such as area 302. Mobile station 307 continues to communicate over frequency F3. However, in area 302, frequency F3 is allowed for use by femtocells, as is frequency F2. Frequency F1 is reserved for mobile station/macro BTS communication (or other non-femtocell communications) within area 302. Accordingly, as above, when mobile station 307 communicates over frequency F3 in area 302, RNC 120 identifies (403) a low signal quality for such communications. RNC 120 therefore directs (404) mobile station 307 to switch to frequency F1. In area 302, femtocells are prohibited from communicating over frequency F1. Therefore, as was the case above, communications between the mobile station and base station 305 experience less signal degradation.

When mobile station 307 moves from area 302 to area 303, mobile station 307 will experience the same type of signal degradation described above. That is, in area 303, frequency F1 is allowed for femtocell communication, and mobile station 307 is likely to approach an interfering femtocell. Accordingly, part 408 of process 400 is repeated for area 303, which causes the communication frequency of mobile station 307 to switch to frequency F2. The same process occurs when the mobile station moves between sectors of the cell, e.g., from sector 102b to a sector 102c (FIG. 1).

Process 400 is not limited to use with the sector configuration shown in FIG. 3. For example, there may be any number of femtocells per sector area; there may be any number of areas per sector; there may be any number of frequencies allowed per area for femtocell communication; and there may be any number of frequencies reserved per area for non-femtocell communication. In an implementation, the number of areas is equal to the number of frequencies reserved for non-femtocell communication. That is, one frequency per area may be reserved for non-femtocell communication. In another implementation, two frequencies are reserved per area for non-femtocell communication. In implementations, the RNC (or base station) is programmed accordingly to control mobile station(s) within each area. A mobile station may be directed by the RNC to use one of the non-femtocell communication frequencies. An RNC may allocate communication frequencies among mobile stations based on various factors.

Outside of femtocell areas of a sector, all frequencies available in that sector or cell may be used by mobile station(s) for communication with the macro BTS. Alternatively, a subset of frequencies available in that sector or cell may be used. The RNC(s) for each sector/cell may be programmed to control the mobile stations accordingly.

By allocating frequency(ies) to femtocells, and reserving frequency(ies) for mobile stations, the cell is able to accommodate a relatively large number of communication signals. Furthermore, it reduces the need to continuously redirect the communication frequencies of the mobile stations; instead limiting redirection to movement between areas. Also, the number of mobile stations per frequency need not be changed significantly from the case where no femtocells are present, and inter-femtocell interference can be reduced.

Process 400 and its various modifications (hereinafter "the processes"), are not limited to the hardware and software described above. All or part of the processes can be implemented, at least in part, via a computer program product, e.g., a computer program tangibly embodied in an information carrier, such as one or more machine-readable media or computer-readable medium, for execution by, or to control the operation of, one or more data processing apparatus, e.g., a programmable processor, a computer, multiple computers, and/or programmable logic components. The computer program product may be resident in the base station, femtocells, and/or the mobile station.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

The foregoing implementations describe RNCs controlling the mobile stations. This functionality may be incorporated into a base station, such as the macro BTS, or in any other device included inside of, or outside of, a cell.

Components of different implementations described herein may be combined to form other embodiments not specifically set forth above. Other implementations not specifically described herein are also within the scope of the following claims.

What is claimed is:

1. A system for use in a wireless communication system comprised of cells, at least one of the cells comprising at least one sector, the system comprising:
    first access points in a first area of a sector of a cell, wherein the first access points are prohibited from communicating over a first frequency;
    second access points in a second area of the sector of the cell, wherein the second access points are prohibited from communicating over a second frequency that is different from the first frequency; and
    a macro base transceiver station (BTS) in the cell, the macro BTS being configured to communicate with a mobile station;
    wherein, in the first area, the first frequency is reserved for communication between the macro BTS and the mobile station and, in the second area, the second frequency is reserved for communication between the macro BTS and the mobile station.

2. The system of claim 1, further comprising:
third access points in a third area of the sector of the cell, wherein the third access points are prohibited from communicating over a third frequency that is different from the first frequency and different from the second frequency.

3. The system of claim 2, further comprising:
an $N^{th}$ (N>3) set of access points in an $N^{th}$ area of the sector of the cell, wherein the $N^{th}$ set of access points are prohibited from communicating over an $N^{th}$ frequency that is different from the first frequency, different from the second frequency, and different from the third frequency.

4. The system of claim 1, wherein the first access points are prohibited from communicating over a third frequency that is different from the first frequency and the second frequency; and
wherein the second access points are prohibited from communicating over a fourth frequency that is different from the first frequency, the second frequency, and the third frequency.

5. The system of claim 1, further comprising:
the mobile station; and
a controller associated with the sector, the controller being configured to:
direct the mobile station, after entering an area of the sector, to communicate over a frequency over which access points in the area are prohibited from communicating.

6. The system of claim 5, wherein the controller is configured to identify interference in communications with the mobile station and to direct the mobile station after identifying the interference.

7. The system of claim 1, wherein the first area and the second area are separated by a zone in which communications of the first access points and the second access points do not interfere.

8. The system of claim 7, wherein the zone is predefined based on geography of a region encompassing the sector.

9. A method for use in a wireless communication system comprised of cells, at least one of the cells comprising at least one sector, the method comprising:
first access points in a first area of a sector of a cell communicating over one or more frequencies but not over a first frequency;
second access points in a second area of the sector of the cell communicating over one or more frequencies but not over a second frequency that is different from the first frequency; and
a macro base transceiver station (BTS) in the cell, the macro BTS communicating with a mobile station in the cell;
wherein, in the first area, the first frequency is reserved for communication between the macro BTS and the mobile station and, in the second area, the second frequency is reserved for communication between the macro BTS and the mobile station.

10. The method of claim 9, further comprising:
third access points in a third area of the sector of the cell communicating over one or more frequencies but not over a third frequency that is different from the first frequency and different from the second frequency.

11. The method of claim 10, further comprising:
an $N^{th}$ (N>3) set of access points in an $N^{th}$ area of the sector of the cell communicating over one or more frequencies but not over an $N^{th}$ frequency that is different from the first frequency, different from the second frequency, and different from the third frequency.

12. The method of claim 9, wherein the first access points are prohibited from communicating over a third frequency that is different from the first frequency and the second frequency; and
wherein the second access points are prohibited from communicating over a fourth frequency that is different from the first frequency, the second frequency, and the third frequency.

13. The method of claim 9, further comprising:
the mobile station attempting to communicate with a base station associated with the sector; and
a controller directing the mobile station, after entering an area of the sector, to communicate over a frequency over which access points in the area are prohibited from communicating.

14. The method of claim 13, wherein the controller identifies interference in communications with the mobile station and directs the mobile station after identifying the interference.

15. The method of claim 9, wherein the first area and the second area are separated by a zone in which communications of the first access points and the second access points do not interfere.

16. The method of claim 15, wherein the zone is predefined based on geography of a region encompassing the sector.

17. A method comprising:
sharing frequencies for communication among access points of a cell sector;
in each predefined area of a sector, reserving at least one frequency for communication by a mobile station, the at least one frequency being different in each area;
wherein access points in each area of the sector are configured not to communicate over the at least one frequency for each corresponding area;
wherein the at least one frequency in each area is reserved exclusively for communication between a macro base transceiver station (BTS) in the cell and the mobile station.

18. The method of claim 17, further comprising:
upon entering an area of the sector, controlling the mobile station to communicate over the at least one frequency corresponding to the area entered if interference from an access point is detected.

19. The method of claim 17, wherein there are N (N≥2) areas; and
wherein there are a multiple of N frequencies reserved for communication by the mobile station.

20. The method of claim 19, wherein predefined areas of the sector are separated by substantially interference-free zones.

21. A macro base transceiver station (BTS) for use in a wireless communication system comprised of cells, at least one of the cells comprising at least one sector, the wireless communication system comprising:
first access points in a first area of a sector of a cell, wherein the first access points are prohibited from communicating over a first frequency; and
second access points in a second area of the sector of the cell, wherein the second access points are prohibited from communicating over a second frequency that is different from the first frequency;
the macro BTS being in the cell, and the macro BTS being configured to communicate with a mobile station such that: (i) the macro BTS is configured to communicate with the mobile station using the first frequency in the first area, but not the second frequency, and (ii) the macro BTS is configured to communicate with the mobile station using the second frequency in the second area, but not the first frequency.

22. One or more machine-readable storage devices storing instructions that are executable by a macro base transceiver station (BTS), the macro BTS for use in a wireless communication system comprised of cells, at least one of the cells comprising at least one sector, the wireless communication system comprising:

first access points in a first area of a sector of a cell, wherein the first access points are prohibited from communicating over a first frequency; and second access points in a second area of the sector of the cell, wherein the second access points are prohibited from communicating over a second frequency that is different from the first frequency;

the macro BTS being in the cell, and the macro BTS being configured to execute the instructions to perform operations comprising communicating with a mobile station such that: (i) the macro BTS communicates with the mobile station using the first frequency in the first area, but not the second frequency, and (ii) the macro BTS communicates with the mobile station using the second frequency in the second area, but not the first frequency.

* * * * *